United States Patent [19]

Nishikawa et al.

[11] Patent Number: 4,658,943
[45] Date of Patent: Apr. 21, 1987

[54] CONTROL SYSTEM FOR ENGINE-DRIVEN AUXILIARY EQUIPMENT FOR VEHICLES

[75] Inventors: Masao Nishikawa, Tokyo; Junichi Miyake, Saitama; Yoshimi Sakurai, Tokyo, all of Japan

[73] Assignee: Honda Giken Kogyo Kabushiki Kaisha, Tokyo, Japan

[21] Appl. No.: 802,125

[22] Filed: Nov. 25, 1985

[30] Foreign Application Priority Data

Nov. 28, 1984 [JP] Japan .................... 59-251331

[51] Int. Cl.⁴ .............................. B60K 41/28
[52] U.S. Cl. .................... 192/0.073; 62/133; 62/186; 74/866; 180/53.1; 192/0.052; 192/3.58; 364/424; 364/424.1; 364/431.07
[58] Field of Search ............. 180/53.1, 65.8, 682, 180/133; 62/133, 186; 74/866; 192/0.052, 0.073, 0.076, 0.07, 0.032, 0.033, 3.58, 3.54; 364/424.1, 431.07

[56] References Cited

U.S. PATENT DOCUMENTS

| | | | |
|---|---|---|---|
| 4,425,766 | 1/1984 | Claypole | 62/133 |
| 4,476,970 | 10/1984 | Ito | 192/3.58 X |
| 4,523,281 | 6/1985 | Noda et al. | 74/866 X |
| 4,556,942 | 12/1985 | Russo et al. | 364/431.07 |
| 4,606,197 | 8/1976 | Takahashi et al. | 62/133 |

FOREIGN PATENT DOCUMENTS

| | | | |
|---|---|---|---|
| 47-10721 | 3/1972 | Japan . | |
| 51-41315 | 10/1976 | Japan . | |
| 39354 | 4/1981 | Japan | 192/0.052 |

Primary Examiner—John J. Love
Assistant Examiner—Mitchell J. Hill
Attorney, Agent, or Firm—Armstrong, Nikaido, Marmelstein & Kubovcik

[57] ABSTRACT

A control system (100) for an engine-driven auxiliary equipment (51) for vehicles including a central control circuit (31) for controlling the shifting of gear ratios (low, 2nd) of an automatic transmission (10), which drives a driven wheel with power from an engine (1), in conformity with a shift may (Mt) having as variables thereof the vehicle speed (V) of the vehicle and the output (Th) of the engine (1), depending on an instantaneous vehicle speed (Vd) and an instantaneous engine output (Thd), is to control the auxiliary equipment (51), which is driven with power from the engine (1) and provided with a mechanism (52, 53) for transmitting and interrupting the power from the engine (1) to the auxiliary equipment (51). The control system (100) further has a control map (Mc) intended for the auxiliary equipment (51), the control map (Mc) being overlapped on the shift map (Mt) and having as variables thereof the vehicle speed (V) of the vehicle and the output (Th) of the engine (1), and is to control the auxiliary equipment (591) in conformity with the control map (Mc).

8 Claims, 7 Drawing Figures

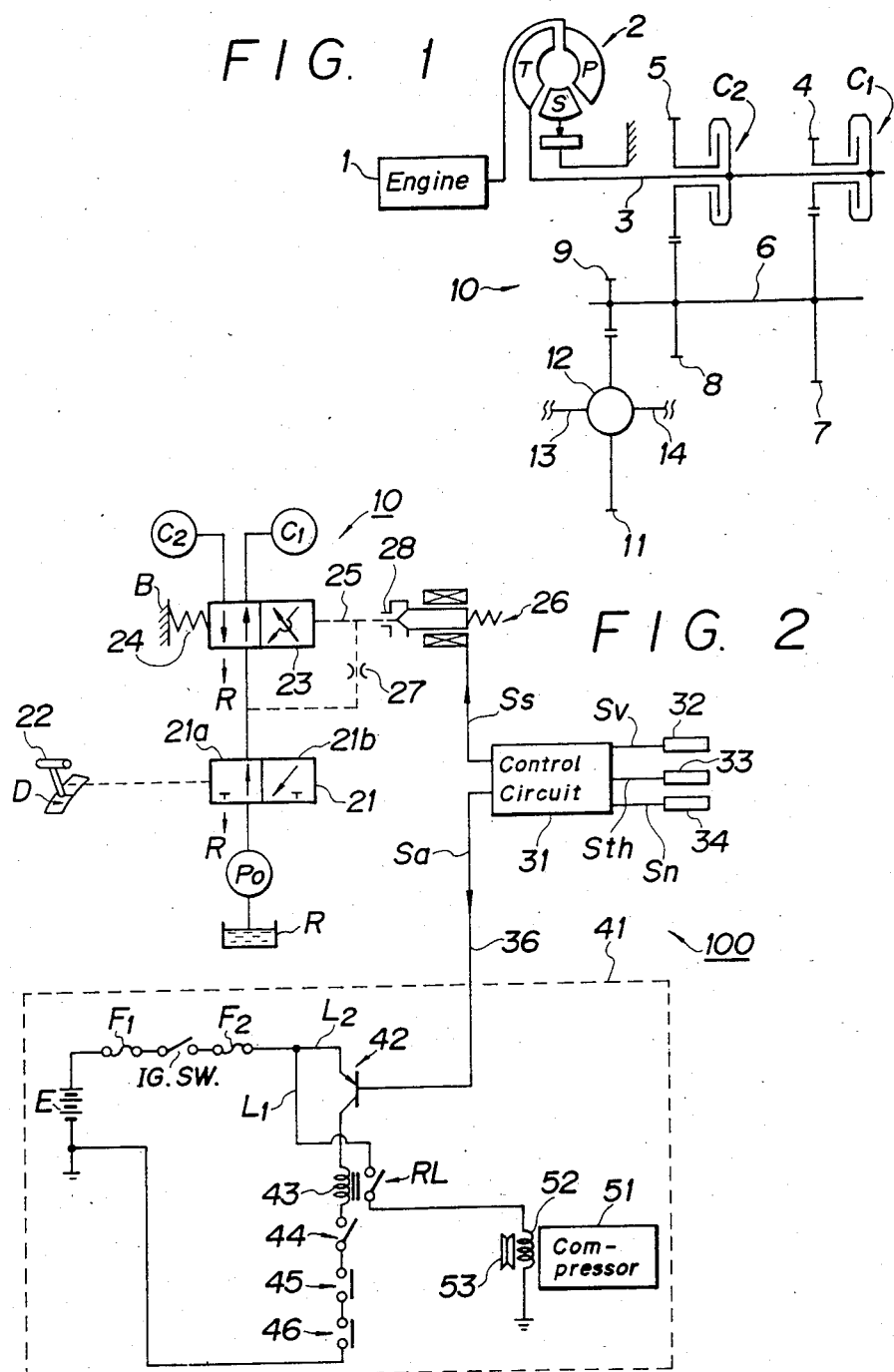

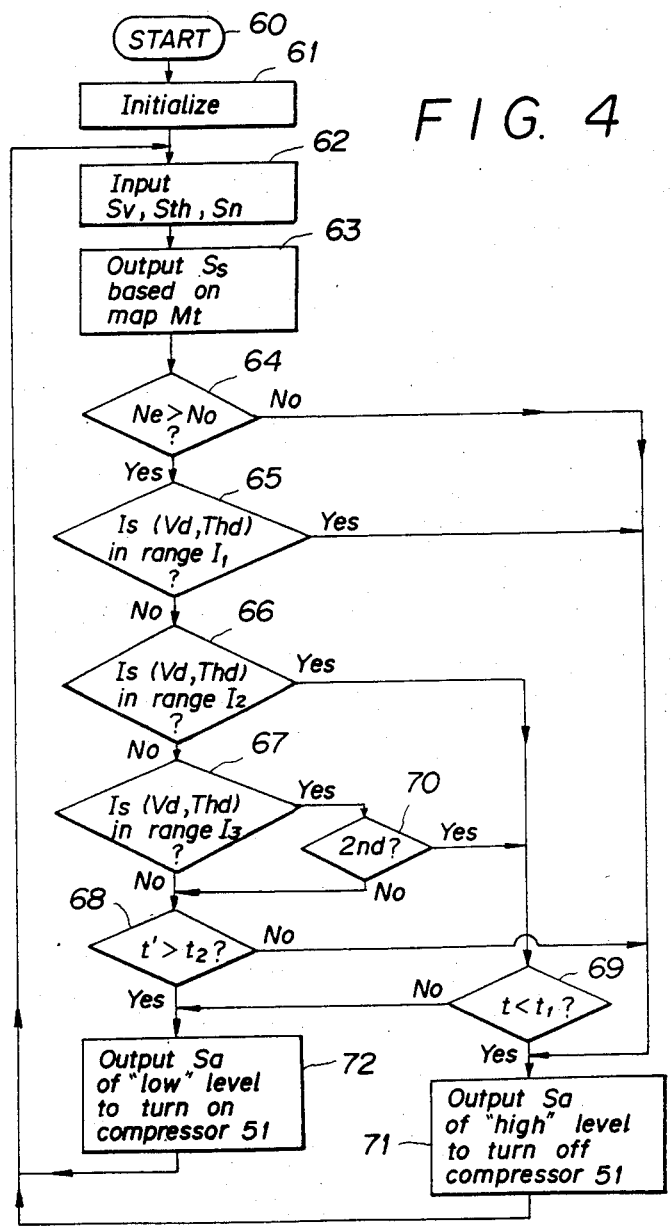

CONTROL SYSTEM FOR ENGINE-DRIVEN AUXILIARY EQUIPMENT FOR VEHICLES

BACKGROUND OF THE INVENTION

1. Field of the Invention

The present invention generally relates to a control system for auxiliary equipment for vehicles. More particularly, it relates to a control system for auxiliary equipment for vehicles which are driven by engine power.

2. Description of Relevant Art

There are varieties of control system of the type that are engine driven which control, in conjunction with the state of acceleration of an engine, auxiliary equipment for vehicles, such as an air conditioner compressor for cooling.

Exemplarily, Japanese Patent Publication No. 47-10721, published on Mar. 31, 1972, discloses a control system which permits part of the engine power to be supplied to an air conditioner compressor for cooling a vehicle while an acceleration pedal is depressed and exceeds a predetermined stroke thereof, or another state such that a carburetor intake pipe has a negative inner pressure attendant such as when the vehicle is travelling on a downward slope.

In such a control system, however, since the cooling oriented air conditioner, which generally consumes a lot of energy when operating, is supplied with the operating energy from an engine with limited output energy capacity, the engine power originally intended to propel the vehicle is even more reduced, so that the ability to accelerate decreased.

For such a reason, conventionally, there have already been proposed a number of control systems of a type to stop the operation of a compressor by detecting the state of acceleration of the vehicle.

For example, Japanese Utility Model Publication No. 51-41315, published on Oct. 7, 1976, discloses a control system to detect the stroke of a depressed acceleration pedal and the number of revolutions of an engine in order to control a cooling compressor, such that no power is supplied from the engine to the compressor when the revolution number is not increased in accordance with the stroke of the depressed acceleration pedal.

With such a control system, however, the compressor is to be stopped when the vehicle is traveling up a relatively long upward slope too.

In vehicles which are equipped with an automatic transmission including a fluid coupling, particularly such as a torque converter, when a cooling air conditioner is operated, the startability as well as the performance of acceleration of the vehicle is greatly affected by the air conditioner compressor for the following reasons:

(1) A fluid coupling generally has a very poor transmission efficiency of almost zero percent in the vicinity of a stalling point of an engine or in the vehicle speed range near zero. Thus, when a fluid coupling is used, the energy of acceleration inherently transmitted to a tire is reduced in such a range.

(2) In general, the energy for driving the compressor is in proportion to the number of revolutions, while the stalling revolution number of the automatic transmission is relatively high. Thus, more energy is consumed by the compressor in a vehicle with an automatic transmission than compared with a vehicle with a manual transmission.

Accordingly, in a control system of a vehicle equipped with an automatic transmission and an air conditioner, it is first of all desired to accurately detect the state of acceleration to control the shutdown of a compressor and, besides, for the system to perform a controlled shutdown of the compressor also when accelerated to pass another vehicle.

Some automatic transmissions employed an electronic control for setting of characteristics as well as for accuracy. Such an electronic type automatic transmission generally includes a shift map which ordinarily has an abscissa representing the vehicle speed (V), and an ordinate representing a parameter representative of engine output, such as the opening of a throttle (Th). Such a shift map is able to clearly indicate the range of adequate regions for starting and accelerating the vehicle.

In the accompanying drawings, FIG. 7 is a typical example a shift map that is used in an ordinary electronic control type automatic transmission having three forward speeds.

In FIG. 7, the abscissa represents the vehicle speed V, and the ordinate the throttle opening Th. Shown by thick lines X and Y are the boundary between a first speed zone and a second speed zone and between the second speed zone and a third speed zone respectively. Designated at reference character $A_1$ is a region for starting and accelerating a vehicle, where the automatic transmission is set at a shift position of the first speed, $A_2$ is a region for ordinary accelerating operations such as passing another vehicle which is usually performed after a shift-down from the third speed to the second speed, and $A_3$ is a region for normal acceleration performed in third speed by lightly depressing an acceleration pedal of the vehicle. On the map, each instaneous control point is identified as a coordinate (Vd, Thd) of respective instantaneous values of the vehicle speed V and throttle opening Th. For example, when the vehicle is traveling on a steep or gentle long upward slope at a constant speed, adequate control points are to be found in the region $A_2$ or $A_3$ in accordance with respective instaneous values Vd, Thd.

The present invention has been achieved to successfully substantiate such a desideratum as described in conjunction with conventional control system for engine-driven auxiliary equipments such as air conditioners for vehicles. Particularly, it is achieved from a view point that such desideratum is characteristic to vehicles of the type which includes an electronic control type atuomatic transmission having a fluid coupling, and where in general a shift map is advantageously utilized in such an automatic transmission.

SUMMARY OF THE INVENTION

Accordingly, an object of the present invention is to provide a control system for engine-driven auxiliary equipment for vehicles which when applied to a vehicle, even when applied to a vehicle equipped with an automatic transmission, performs acceleration in the starting of the vehicle, as well as when passing as is inherently intended for the vehicle.

The present invention provides a control system for an engine-driven auxiliary equipment for a vehicle including an engine, an automatic transmission receiving power from the engine to drive a driven wheel. The automatic transmission has a plurality of gear ratios.

The auxiliary equipment is driven with power from the engine, and the auxiliary equipment having a transmitting-and-interrupting means for transmitting and interrupting the power from the engine to the auxiliary equipment. The control system controls the auxiliary equipment and comprises a central circuit, a vehicle speed detecting means for feeding the control circuit with a signal representing an instantaneous vehicle speed, an engine output detecting means for feeding the control circuit with a signal representing an instantaneous engine output, and a shift map for the automatic transmission. The shift map has as variables thereof the speed of the vehicle and the output of the engine. The control circuit controls the shifting of the gear ratios depending on the shift map. The control system further comprises a control map intended for the auxiliary equipment. The control map is overlapped on the shift map, and the control map has as variables thereof the speed of the vehicle and the output of the engine. The transmitting-and-interrupting means of the auxiliary equipment is controlled depending on the control map.

The above and further features, objects and advantages of the present invention will more fully appear from the following detailed description of a preferred embodiment of the invention when the same is read in conjunction with the accompanying drawings.

BRIEF DESCRIPTION OF THE DRAWINGS

In the drawings;

FIG. 1 is a power train diagram of a torque converter type automatic transmission of a vehicle which has a control system according to a preferred embodiment of the present invention for an air conditioner as auxiliary equipment driven by an engine;

FIG. 2 is a diagram of a control circuit of the control system according to the present invention, which controls the automatic transmission and the air conditioner;

FIG. 3 is a graph showing a control map for a compressor of the air conditioner controlled with the control system, as the control map is overlapped on a shift map that the automatic transmission is originally provided with;

FIG. 4 is a flow chart of a program of the control system;

DETAILED DESCRIPTION OF THE PREFERRED EMBODIMENT

Figure 3:
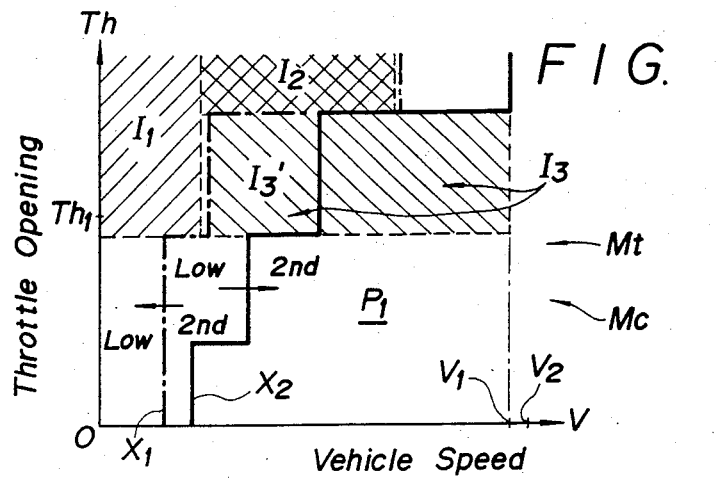

Referring first to FIG. 1, designated at reference numeral 10 is the entirety of a torque converting automatic transmission of an electronic shift control type in a vehicle that is furnished with an air conditioner as auxiliary equipment driven with an engine 1. The air conditioner has a later-described drive circuit governed by a later-described control system according to a preferred embodiment of the present invention. For simplicity, the automatic transmission 10 is embodied as a two-speed type having a pair of mutually shiftable forward speeds called "first" or "low" and "second", respectively, while further having a reverse power train.

The engine 1 has power transmitted as output torque to a pump P of a torque converter 2, where it is fluid-mechanically converted to torque at a turbine T, as it is amplified between the pump P and the turbine T, while the reaction thereto is borne by a stator S.

The turbine T is connected to a mainshaft 3, which has a low-speed oriented clutch $C_1$ and a high-speed oriented clutch $C_2$ integrally operatively fixed thereon, respectively, and a low-speed drive gear 4 and a high-speed drive gear 5 free-rotatably loose-fitted thereon, respectively. The clutches $C_1$, $C_2$ are selected through the function of the control system, and are forced into connection with a corresponding one of the gears 4, 5, so that that gear 4 or 5 at the selected side becomes integrally rotatable with the mainshaft 3. On the other hand, countershaft 6, arranged in parallel with the mainshaft 3, has fixed integrally therewith a low-speed and a high-speed driven gears 7, 8 meshing which the drive gears 4, 5 respectively. In addition, countershaft 6 has a final gear 9 meshing with a ring gear 11 of a differential 12. The differential 12 has side axels 13, 14 to drive left and right drive wheels (not shown) of the vehicle.

With such an arrangement of the automatic transmission 10, when the low-speed clutch $C_1$ is forced into connection while releasing or disconnecting the high-speed clutch $C_2$, a gear ratio of the first speed is established. Similarly, when the high-speed clutch $C_2$ is forced into connection while releasing the low-speed clutch $C_1$, there is established a gear ratio of the second speed.

Referring now to FIG. 2, designated by reference numeral 100 is the entirety of the control system according to the present invention. The control system effects speed control of the transmission 10 by bring the clutches $C_1$, $C_2$ into connection or disconnection, as circumstances require, as well as controls of operation of the air conditioner including a compressor 51. Control is effected by the aid of an electric circuit 41 in the air conditioner as the aforesaid drive circuit therefor.

As shown in FIG. 2, the transmission 10 has a hydraulic circuit including a hydraulic source Po with an oil pump driven by the engine 1 to pump up hydraulic oil from an oil reservoir R to the clutch $C_1$ or $C_2$, as required.

The hydraulic oil pressurized at the hydraulic source Po is sent to a speed selection valve 21, which has a supply path 21a interconnecting the hydraulic source Po with a shift valve 23 when a shift lever 22 is put in a forward position D as illustrated in FIG. 2. The shift valve 23 is normally urged like a poppet valve toward a position intended for low-speed use, as shown in FIG. 2. The shift valve 23 is urged with a spring 24 fixed at a vehicle body end B. A pilot path 25 is controlled, by a solenoid valve 26, to supply hydraulic pressure, when necessary, for urging the shift valve 23 toward another position intended for high-speed use.

When the solenoid valve 26 is energized as shown in FIG. 2, the pilot path 25 has a reduced hydraulic pressure, due to the resistance across an orifice 27 substantially maintained at a zero pressure level, so that the shift valve 23 is kept at the low-speed position. Similarly, when the solenoid valve 26 is de-energized, thereby closing a delivery nozzle 28 thereof, the spring 24 has the resilient strength set so as to bring the shift valve 23 into the high-speed position.

When the shift valve 23 is in the low-speed position, as shown in FIG. 2, the hydraulic source Po is connected to the low-speed clutch $C_1$, establishing the gear ratio of the first speed, while the high-speed clutch $C_2$ is connected to the oil reservoir R. Similarly, when the shift valve is brought to the left in FIG. 2 into the high-speed position, the hydraulic source Po is connected to the high-speed clutch $C_2$, establishing the gear ratio of the second speed, while the low-speed clutch $C_1$ is connected to the oil reservoir R.

In the automatic transmission 10 with such hydraulic circuitry, the speed selection valve 21 moves, exemplarily when the shift lever 22 is moved into a neutral range (not shown), to the left in FIG. 2 to have a return path 21b thereof inserted between a hydraulic line at the clutch side and the oil reservoir R, thereby returning hydraulic oil from the former to the latter.

The action of the solenoid valve 26 is controlled with an excitation control signal Ss sent from a central electronic control circuit 31 which includes necessary circuit elements (not shown) such as a signal processor and a memory cooperating therewith.

The electronic control circuit 31 has input thereto an output signal from a vehicle speed detector 32 to detect the velocity of the vehicle, herein called "vehicle speed V". The output signal is an electric signal, named "vehicle speed signal Sv", representing an instantaneous value Vd of the vehicle speed V as detected. Another output signal from a throttle opening detector 33 detects the degree of opening of a throttle (not shown) of the engine 1, herein called "throttle opening Th". The signal is also an electric signal, indentified as "throttle opening signal Sth", and represents an instantaneous value Thd of the throttle opening Th as detected.

With the vehicle speed signal Sv and the throttle opening signal Sth input, the control circuit 31 controls a solenoid value 26 based on a later-described shift map. The shift map is stored in the memory and constructed to identify the coordinate of any point for the shift map based on the combination of a pair of parameters. The parameters are identified in terms of the instantaneous values Vd, Thd of the vehicle speed V and the throttle opening Th. The values Vd, Thd are determined from the signals Sv and the Sth respectively. The control 31 determines where or in which zone the point, as indentified by the parameters Vd, Thd, is located, and controls the open-close actions of the solenoid valve 26 according to the results of the determination.

In FIG. 2, an engine revolution number detector 34 detects the number of revolutions per minute of the engine 1, herein called "revolution number Ne", and outputs therefrom an electric signal representing the revolution number Ne, or "revolution number signal Sn".

Referring now to FIG. 3, the shift map Mt of the control circuit 31 is used to control the solenoid valve 26.

FIG. 3 shows the shift map Mt overlapped on a control map Mc. The control map Mc is used for controlling the compressor 51. The control map Mc has a permission region $P_1$ and three regions $I_1$, $I_2$, $I_3$ where operation of the compressor 51 is prohibited.

In FIG. 3 in shift map Mt, the solid line $X_2$ defines the boundary at a shift-up operation between a zone "low" of the first speed gear ratio and another zone "2nd", of the second speed gear ratio. Chain line $X_1$ defined the boundary at a shift-down operation between the 2nd zone to the low zone. The zone defined between the shift-down boundary $X_1$ and the shift-up boundary $X_2$ is called "hysteresis", which is a zone preset for prevention of the damage to the automatic transmission 10.

The electronic control circuit 31 controls the shifting of the automatic transmission 10 in conformity with the shift map Mt and in accordance with the vehicle speed signal Sv and the throttle opening signal Sth, as described. In addition, circuit 31 feeds a control signal Sa (FIG. 2) to the conditioner circuit 41, thereby controlling the operation of the compressor 51, in conformity with the control map Mc and in accordance with the revolution number signal Sn as well as the signals Sv, Sth, as will be detailed later.

More particularly, control circuit 31 operates using the control map Mc such that, when the coordinate (Vd, Thd) of the instantaneous values Vd and Thd is at a point within the range of an of the prohibition regions $I_1$, $I_2$, $I_3$ under a later-described condition, the control signal Sa set at a "high" level is output through an electric line 36 (FIG. 2), thereby stopping operation of the compressor 51. On the other hand, when the coordinate (Vd, Vhd) is not at a point within any of the prohibition regions $I_1$, $I_2$, $I_3$ under a later-described condition, the signal Sa set at a "low" level is output, thereby permitting the compressor 51 to operate.

The conditioner circuit 41 as described below is a drive circuit of the air conditioner, including the compressor 51.

The conditioner circuit 41 has a vehicle-mounted battery E as an electric source. The battery E has at the positive pole, a supply line including a main fuse $F_1$, an ignition switch IG.SW., and a conditioner circuit fuse $F_2$. After the fuse $F_2$, the supply line branches into a pair of branch lines $L_1$, $L_2$. One branch line $L_1$ is connected, through a relay switch RL, to an exciting coil 52 of an electromagnetic clutch (not shown) coupled to a pulley 53. The pulley 53 is driven with a power from the engine 1, with the compressor 51, and ground thereafter. The other branch line $L_2$ is connected, through a pnp transistor 42, to an exciting coil 43 of the relay switch RL, and grounded via a manual switch 44 for on-off operation of the air conditioner, a temperature-sensitive limit switch 45, and a pressure-sensitive limit switch 46. The temperature switch is located at an outlet (not shown) that blows cold air from the air conditioner. The switch 45 closes when the temperature of blown air is raised higher than a predetermined temperature level. The switch opens when the temperature is below the predetermined level. The pressure switch 46 closes when the gas pressure of the air conditioner coolant falls below a predetermined pressure level and opens when the gas pressure is above the predetermined level.

In the foregoing control system 100, when the switches IG.SW and 44 to 46 of the branch line $L_2$ are closed and the control signal Sa is at the "low" level, the coil 43 of the relay switch RL is energized closing the relay switch RL, so that the coil 52 of the electromagnetic clutch is energized which couples the pulley 53 with the compressor 51. As a result, the compressor 51 is driven to start an air cooling cycle of the air conditioner.

Although the electric power line of the control system 100 is illustrated in FIG. 2 for only the conditioner circuit 41, electric power can be supplied from the battery E to the entire system including the control circuit 31, when the ignition switch IG.SW. is turned on.

Referring now to FIG. 4, a control program of the control system 100 is described below.

The control program of the system 100, which is stored in the memory of the control circuit 31, starts when the switch IG.SW. is turned on, indicated as a step 60.

At a step 61, the associated parameters are all set to their initial values, and all the elements under the control of the control circuit 31 are all initialized.

At a step 62, the vehicle speed signal Sv from the vehicle speed detector 32, the throttle opening signal Sth from the throttle opening detector 33, and the revolution number signal Sn from the engine revolution number detector 34 are read as input, thereby the program obtains the respective instantaneous values Vd, Thd of the vehicle speed V and the throttle opening Th as well as the revolution number Sn which are all stored and utilized as real-time values of the corresponding parameters.

At a step 63, which controls the gear ratio of the automatic transmission 10, the control signal Ss for operating the solenoid valve 26 is output to establish the gear ratio of the first or second speed, as required, based on the shift map Mt and according to the instantaneous values Vd, Thd of the vehicle speed V and the throttle opening Th as read at step 62.

Upon completion of step 63, the control program enters a decision loop consisting of steps 64 to 72 which controls the conditioner circuit 41, as described below.

First, at step 64, the revolution number Ne of the engine 1 is compared to a reference revolution number No to determine if Ne is higher than No. If Ne is not higher than No, the control program goes to step 71, where the control signal Sa set at the "high" level is output through the line 36 to turn off the compressor 51, thereby preventing the engine from stopping. If Ne is higher than No, the control program goes to step 65.

At step 65, the real-time coordinate (V, Th) indentified by the parameters according to the instantaneous values Vd, Thd of the vehicle speed V and the throttle opening Th is compared to the range of coordinates within the prohibition region $I_1$ of the control map Mc. If within the range, the control program goes to step 71 to output a signal to turn the compressor off. If not within the range, the control program continues to the steps 66, 67 to determine whether or not the coordinate (Vd, Thd) is in the range of coordinates for the prohibition regions $I_2$ or $I_3$ of the map Mc.

More particularly, at step 66, the control program determines whether or not the coordinate (Vd, Thd) is within the prohibition region $I_2$. If yes, the control program goes to step 69. If no, the control program goes to step 67 to determine whether or not the coordinate (Vd, Thd) is within the prohibition region $I_3$. If the coordinate (Vd, Thd) is within the region $I_3$, the control program goes to step 70, but if not, goes to step 68.

At step 70, the control program determines of the gear ratio of the automatic transmission 10 is set within the 2nd zone on the shift map Mt. This is determined by reading the contents of the control signal Ss held in memory. The signal Ss is to be sent to the solenoid valve 26 of the automatic transmission 10. If the gear ratio is within 2nd zone, the control program goes to step 69, but if not within the zone the control program goes to step 68.

A lapse time t is counted by a software timer of the program from the time at which the coordinate (Vd, Thd) was confirmed to be within the prohibition region $I_2$ or $I_3$. At step 69, lapse time t is compared to a first reference time $t_1$ to determine which is shorter. If the time t is shorter than the reference time $t_1$, the control program goes to step 71 to turn off the compressor 51. If the time t is longer than the reference time $t_1$, the control program goes to step 72.

At step 72, the control signal Sa set at the "low" level is output through the line 36 to turn on the compressor 51.

As described, if the coordinate (Vd, Thd) is not within the prohibition region $I_3$ at step 67, the control program goes to step 68. In this respect, if the control program has come to step 68, via the steps 65, 66, 67, the coordinate (Vd, Thd) is not within the range of any of the regions $I_1$, $I_2$, and $I_3$.

A lapse time t' is counted by another software timer of the program from the time at which the coordinate (Vd, Thd) was determined not to be within any of the regions $I_1$, $I_2$, $I_3$. At step 68, the lapse time t' is compared to a second reference time $t_2$ to determine which is longer. If the time t' is shorter than the reference time $t_2$, the control program goes to step 71 to turn off the compressor 51, but if the time t' is longer than the reference time $t_2$, the control program goes to step 72 to turn on the compressor 51.

In the control system 100, the first and the second reference time $t_1$, $t_2$ are preset to be a relatively long time and a relatively short time with respect to each other. Exemplarily, the times are preferably set equal to the time periods of 10 seconds and 3 seconds, respectively.

The first reference time $t_1$ is used when the vehicle is traveling along a long upward slope, even if the coordinate (Vd, Thd) is continuously held within the range of the regions $I_2$, $I_3$. The compressor 51 turns on when the lapse time t has exceeded the reference time $t_1$. Therefore, the air conditioner is effectively prevented from being kept in a shut down state for a long period of time.

Further, with the second reference time $t_2$ used as described, even if the coordinate (Vd, Thd) is frequently within the range of the prohibition regions $I_1$, $I_2$, $I_3$ and within the permission region $P_1$ on the control map Mc due to violent variations in the stroke of an acceleration pedal (not shown) of the vehicle, the compressor 51 avoids frequently repeating on and off states, thereby effectively preventing the air conditioner from being damaged.

As described, when the determination at step 67 is affirmative while at step 70 is negative, the control program goes to step 68. That is, although the coordinate (Vd, Thd) is determined to be within the region $I_3$, the gear ratio of the automatic transmission 10 is determined not to be within the 2nd zone, therefor the control program goes to step 68.

In this respect, when the control program goes through the steps 67, 70, and 68, the coordinate (Vd, Thd) is located in a part of the prohibition region $I_3$ that extends from the left side of the shift-up boundary $X_2$ in the graph of FIG. 3, which part is identified as the "partial region $I_3'$" of the region $I_3$.

In the program shown in FIG. 4, the process before and after step 68 is inherently intended for the case where the coordinate (Vd, Thd) is found to be in the permission region $P_1$ which is the complement of the union of the prohibition regions $I_1$, $I_2$, $I_3$ on the control map Mc.

Thus, the process from step 70 to step 68 is constructed on the basis that the partial region $I_3'$ of the prohibition region $I_3$ should be handled as part of the permission region $P_1$ if the gear ratio of the automatic transmission 10 is in the low zone, that is if in first speed.

Furthermore, the program of FIG. 4 includes the step 69 for determining whether or not the lapse time t is shorter than the first reference time $t_1$. Lapse time t is determined from the time when current coordinate (Vd, Thd) is first determined to be within the range of the region $I_2$ or $I_3$. The control program necessarily contains a set of processes somewhere in the program to reset the software timer for the lapse time t and to increment the time t as well as to set and reset a flag representing the start of the increment. Similar processes are also provided for counting the lapse time t' required for the determination at step 68. Such processes, however, may well be executed at numerous places through the routine including at steps 64 to 72, and hence are omitted from the drawings.

When interpreting the field of acceleration of the vehicle on the control map Mc of the compressor 51, the prohibition region $I_1$ corresponds to an acceleration region where the vehicle is started. The prohibition region $I_2$ corresponds to an acceleration region when normally passing another vehicle. The prohibition region $I_3$ corresponds to a faint-acceleration region experienced when lightly depressing the acceleration pedal. Thus, the regions $I_2$ and $I_3$ additionally cover regions when traveling steep and gentle slopes.

As described, the control inputs of the electronic control type automatic transmission 10 has the vehicle speed signal Sv and the throttle opening signal Sth representing of engine output. These inputs are also fed to the control circuit 31 which functions as a central processing unit. In addition, the gear ratio of the transmission is input to the control circuit. The current gear return used in the determination in the low zone and in the 2nd zone, so that, on a rectilinear coordinate plane stretched with respect to the vehicle speed V and the throttle opening Th as engine output, the shift map Mt projected thereon can be effectively utilized to set up the control map Mc for operation control of the compressor 51.

Further, while the coordinate (Vd, Thd), identified with the instantaneous values Vd, Thd of the vehicle speed V and the throttle opening Th, is located in the range of any of the prohibition regions $I_1$, $I_2$, $I_3$ on the control map Mc, the compressor 51 is fundamentally kept from being operated. Since the regions $I_1$, $I_2$, $I_3$ correspond to the aforesaid accelerating conditions of the vehicle, the compressor is stopped under accelerating conditions of the vehicle thus, permitting the engine power to be substantially used as energy for acceleration, thereby effectively ensuring the inherent acceleration performance of the vehicle.

According to the embodiment, the control system 100 has in addition to the above described functions an additional distinct function of controlling the conditioner circuit 41 particularly for the operation control of the compressor 51. This additional function is achieved by a simple provision of the control map Mc shown in FIG. 3 through the steps 64 to 72 shown in FIG. 4. Therefore, the present invention can be applied to "a voluntary existing control system adapted to govern an automatic transmission and an air conditioner" in a facile and inexpensive manner. Moreover, utilization of the existing shift map Mt by the control system 100 ensures the reliability of the operation control of the compressor 51.

In this respect of for practical purposes, the control circuit 31 may advantageously be made with a microcomputer system consisting of a central processing unit and various necessary integrated circuits adapted to cooperate therewith.

At step 69 of the control system 100 in FIG. 4 where the lapse time t is used, when the vehicle is traveling a long upward slope, the compressor 51 is kept out of service for an initial duration equivalent to the first reference time $t_1$ (approx. 10 seconds) and put back into service thereafter, so that the air conditioner is permitted to effectively cool.

Figure 7:
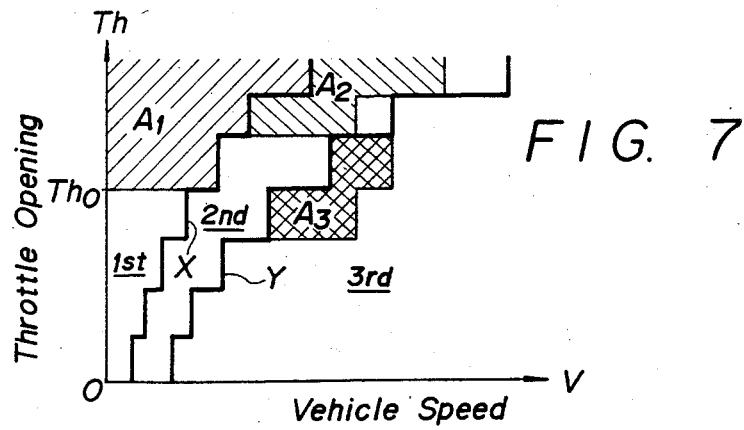
FIG. 7 is a graph exemplarily showing a conventional shift map for an ordinary electronic control type automatic transmission having three forward speeds.

Similarly, at step 68 of the control system 100, in FIG. 4, where the lapse time t' is used when the vehicle is traveling with the compressor 51 shut down due to acceleration of the vehicle, even if the coordinate (Vd, Thd) enters the permission regions $P_1$ due to deceleration of the vehicle, the compressor 51 will be kept out of service until an additional duration equivalent to the second reference time $t_2$ (approx. 3 seconds) has elapsed. Accordingly, even if acceleration and deceleration are frequently performed in an alternating manner, the compressor 51 is kept out of service, so that damage to the compressor 51 will be prevented and moveover, even under such conditions, the vehicle will not experience a reduction or variation in the capacity of acceleration.

Where an automatic transmission is controlled with a control system for an engine-driven auxiliary equipment for vehicles according to the present invention, the shiftable forward gear thereof exemplarily is a three-staged type analogous to that shown in FIG. 7. The shift map zone "1st" which is intended for establishing a gear ratio for the first speed, has a relatively narrow width with respect to the vehicle speed V. An AND circuit having two-inputs and one-output may be used to determine whether or not a coordinate (Vd, Thd) is in the range of a region $A_1$ where $A_1$ is in the prohibition region of operation for the auxiliary equipment compressor. In this case, the AND circuit may preferably have a signal set at a "high" level fed into one input terminal when the gear ratio is at a first speed and the input signal is set at a "low" level when the gear ratio is otherwise established. At the other input terminal of the AND circuit another signal set at a "high" level is input when the instantaneous value Thd of the throttle opening Th is in a range exceeding a predetermined value Tho and the second input signal is set at a "low" level when the instantaneous value Thd is not detected in this range. If the AND circuit has a "high" level signal given at the output terminal, the coordinate (Vd, Thd) is within the region $A_1$.

As described, the compressor 51 is prevented from being damaged by taking the lapse time t' into consideration. In this respect, preventing damage to compressor 51 may be more advantageously and accurately achieved by providing a region similiar to the zone hysteresis set between the shift-down boundary $X_1$ and the shift-up boundary $X_2$ on the shift map Mt. This region would be a hysteresis region along a boundary between the permission region $P_1$ and the prohibition regions $I_1$, $I_2$, $I_3$ on the control map Mc.

How to advantageously set up such a hysteresis region on the control map Mc will be described below.

A hysteresis region should be set, on the control map Mc, along a boundary extending between the prohibition region $I_3$ and part of the permission region $P_1$ that extends at the higher end of the vehicle speed V with respect to a vehicle speed $V_1$. The vehicle speed $V_1$ is preset to define the limit of the permission region $P_1$ at the higher vehicle speed end.

The instantaneous vehicle speed Vd as detected through the vehicle speed detector 32 has a true value Vt within a small interval of the vehicle speed V in the vicinity and inclusive of the preset vehicle speed $V_1$ or, more exactly, equal to the preset vehicle speed $V_1$. When the vehicle is traveling at a constant vehicle speed, the detected vehicle speed Vd may vary in the vicinity of the preset vehicle speed $V_1$ due to disturbances such as variations in the traveling resistance and electric power as well detection error of the detector 32. In this respect, where the vehicle is traveling at a constant vehicle speed equal to the preset vehicle speed $V_1$, the instantaneous throttle opening Thd may be in the vicinity of $Th_1$ on the control map Mc of FIG. 3.

However, at step 67 of FIG. 4, which determines whether or not the coordinate (Vd, Thd) is within the prohibition regions $I_3$, the detected vehicle speed Vd is compared with the preset vehicle speed $V_1$.

As a result, where there are variation of the detected vehicle speed Vd in the vicinity of the preset vehicle speed $V_1$, the control program after step 67 may go to either steps 68, 70 depending on the variation, thus failing to sufficiently achieve the originally intended purpose of the control program.

Figure 5:
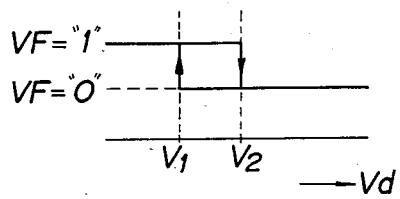
FIG. 5 is a graph showing the state of variations of a flag, which depends on the speed of the vehicle and employed for setting a hysteresis between a compressor operable region and a compressor non-operable region of the control map on FIG. 3.
Figure 6:
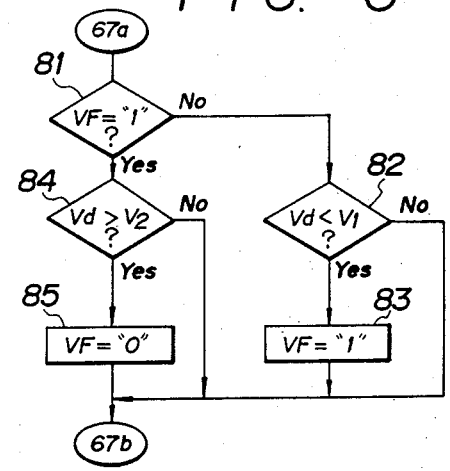
FIG. 6 is a flow chart of a program for varying the single state of the flag of the vehicles speed as shown in FIG. 5.

To fulfill the original purpose, as shown in FIGS. 5 and 6, the present invention provides a vehicle speed flag VF and a process routine for setting and resetting the vehicle speed flag VF.

With reference to FIG. 5, the vehicle speed flag VF is a signal set a "1" when the detected vehicle speed Vd is lower than the present vehicle speed $V_1$, and VF is set to "0" when the detected vehicle speed Vd is higher than another preset vehicle speed $V_2$ which is slightly higher than the present vehicle speed $V_1$.

The signal state of the flag VF is not changed when the vehicle speed is between the preset vehicle speeds $V_1$ and $V_2$.

Moreover, at step 67 of FIG. 4, when the detected vehicle speed Vd is compared with the preset vehicle speed $V_1$, if the vehicle speed flag VF is set to "1" and $Vd \leq V_1$ and if the vehicle speed flag VF is set to "0" than $V_d > V_1$. Therefore, even when the detected vehicle speed Vd is varied due to disturbances, the determination at step 67 can be performed in a stable manner, so that damage to the compressor 51 is prevented.

The routine shown in FIG. 6 sets and resets the vehicle speed flag VF as described in conjunction with FIG. 5. The routine should be executed prior to step 67. However, the routine can be made any time during step 67 such as during or before making the comparison between the detected vehicle speed Vd and the present vehicle speed $V_1$.

With reference to FIG. 6, designated at reference character 67a is the entry point where the control program of FIG. 4 enters when, at step 66, the coordinate (Vd, Thd) is determined not to be within the prohibition region $I_2$.

At step 81, of FIG. 6, a determination is made whether or not the vehicle speed flag VF is set to "1". If VF is set to "1", the program continues to step 84.

At step 84, the detected vehicle speed Vd is compared to the preset vehicle speed $V_2$. If Vd is higher than $V_2$, the program continues to step 85, where the vehicle speed flag Vf is reset to "0" before continuing to node 67b to then proceed to step 67 of the control program of FIG. 4. If Vd is less than $V_2$, the routine directly goes to the node 67b.

On the other hand, at step 81 when the vehicle speed flag VF is not "1", the routine goes to step 82, where the detected vehicle speed Vd is compared to the preset vehicle speed $V_1$ which is the higher vehicle speed limit of the prohibition region $I_3$. If Vd is lower than $V_1$, the routine goes to step 83, where the flag VF is set to "1" before the routine continues to the node 67b. If VD is higher than $V_1$, the routine directly goes to the node 67b.

After the routine continues past the node 67b, step 67 compares the detected vehicle speed Vd with the preset vehicle speed $V_1$ depending on the signal state of the vehicle speed flag VF.

In conjunction with the hysteresis provided between the permission region $P_1$ and the prohibition regions $I_1$, $I_2$, $I_3$ on the control map Mc, an example of the higher limit of the vehicle speed V of the prohibition region $I_3$ defined by the preset vehicle speed is provided. Various hysteresis may advantageously be provided at the lower limit of the vehicle speed V of the prohibition region $I_3$ as well as along the upper limit and/or lower limit of the throttle opening Th of the prohibition region $I_3$. Further, the hysteresis may advantageously be effected with respect to the prohibition regions $I_1$, $I_2$, as well.

In the control system 100 according to the preferred embodiment of the present invention, shift map Mt is originally for an electronic control type automatic transmission 10. The control map Mc has the prohibition regions $I_1$, $I_2$, $I_3$ for operation of the compressor 51 under predetermined conditions of vehicle acceleration. The shift map Mt and the control map Mc together effectively control the compressor 51, such that the operation of the compressor 51 is fundamentally stopped when accelerating for starting and passing another vehicle. The maps accurately take into account the state of vehicle acceleration, so that the inherent capacity of acceleration of the vehicle can be ensured and therefore a highly reliable system can be achieved in an inexpensive manner using existing components.

Further, according to the embodiment, controlling the compressor 15, damage thereto is effectively prevented. Moreover, when traveling a long upward slope, the compressor 51 is not required to be kept out of service for a long time, thus permitting the inherent cooling capacity of the air conditioner to be effectively exhibited.

The compressor 51 of the air conditioner is only an example of engine-driven auxiliary equipment for vehicles controlled by a control system 100. In this respect, a control system 100 according to the present invention may be for optional auxiliary vehicle equipment that is usually driven by an engine. One object of the control system 100 is that even when operation of the auxiliary equipment is interrupted there will not be any substantial effects on various necessary characteristics of the vehicle.

Although what has been described is at present considered to be the preferred embodiment of the invention, it is understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

We claim:

1. A control system (100) for controlling engine-driven auxiliary equipment (51) for a vehicle comprising;
   an engine (1);
   an automatic transmission (10) receiving power from said engine (1) to drive a driven wheel;
   said automatic transmission (10) having a plurality of gear ratios ("first", "second");
   said auxiliary equipment (51) being driven with power from said engine (1); and
   said auxiliary equipment (51) having transmitting-and-interrupting means (52, 53) for transmitting and interrupting the power from said engine (1) to said auxiliary equipment (51),
   a central control circuit (31);
   vehicle speed detecting means (32) for feeding said control circuit with a signal (Sv) representing an instantaneous vehicle speed (Vd);
   engine output detecting means (33) for feeding said control circuit (31) with a signal (Sth) representing an instantaneous engine output (Thd);
   a shift map (Mt) for said automatic transmission (10);
   said shift map (Mt) having as variables thereof the speed (V) of said vehicle and the output (Th) of said engine (1); and
   said control circuit (31) for controlling the shifting of said gear ratios depending on said shift map (Mt), wherein
   said control system further comprises
   a control map (Mc) for controlling said auxiliary equipment (51);
   said control may (Mc) being overlapped on said shift map (Mt); and
   said control map (Mc) having as variables thereof the speed (V) of said vehicle and the output (Th) of said engine (1); and
   said transmitting-and-interrupting means (52, 53) of said auxiliary equipment (51) is controlled depending on said control map (Mc).

2. A control system according to claim 1, wherein:
   said control map (Mc) for said auxiliary equipment (51) has a prohibition region ($I_1$, $I_2$, $I_3$) for prohibiting the operation of said auxiliary equipment (51) and a permission region ($P_1$) for permitting the operation of said auxiliary equipment (51); and
   said control circuit (31), under a condition that said instantaneous vehicle speed (Vd) and said instantaneous engine output (Thd) are located within said prohibition region ($I_1$, $I_2$, $I_3$), stops said transmitting-and-interrupting means (52, 53) to interrupt the power from said engine (1) to said auxiliary equipment (51) and, under a condition that said instantaneous vehicle speed (Vd) and said engine output (Thd) are located within said permission region ($P_1$), starts said transmitting-and-interrupting means (52, 53) to transmit the power from said engine (1) to said auxiliary equipment (51).

3. A control system according to claim 2, wherein:
   said prohibition region ($I_1$, $I_2$, $I_3$) of said control map (Mc) comprises a first prohibition region ($I_1$), a second prohibition region ($I_2$), and a third prohibition region ($I_3$) corresponding, on said shift map (Mt) for said automatic transmission (10), to a starting acceleration region, a usual passing-ahead acceleration region, and a faint acceleration region, respectively.

4. A control system according to claim 3, wherein:
   said control circuit (31) has timer means, under a condition that said instantaneous vehicle speed (Vd) and said instantaneous engine output (Thd) remain within either of said second prohibition region ($I_2$) and said third prohibition region ($I_3$) of said control map (Mc), to count a first lapse time (t) since said vehicle speed (Vd) and said engine output (Thd) have entered same region ($I_2$, $I_3$) from other region ($P_1$, $I_1$); and
   said control circuit (31) is, when said first lapse time (t) has exceeded a first preset time ($t_1$), to start said transmitting-and-interrupting means (52, 53).

5. A control system according to claim 3, wherein:
   said control circuit (31) has timer means, under a condition that said instantaneous vehicle speed (Vd) and said instantaneous engine output (Thd) remain within said permission region ($P_1$, $I_{3'}$) of said control map (Mc), to count a second lapse time (t') since said vehicle speed (Vd) and said engine output (Thd) have entered same region ($P_1$, $I_{3'}$) from other region ($I_1$, $I_2$, $I_3$); and
   said control circuit (31) is, when said second lapse time (t') has exceeded a second preset time ($t_2$), to start said transmitting-and-interrupting means (52, 53).

6. A control system according to claim 2, wherein:
   said control map (Mc) has a hysteresis set between said prohibition region ($I_1$, $I_2$, $I_3$) and said permission region ($P_1$).

7. A control system according to claim 1, wherein:
   said signal (Sth) from said engine output detecting means (33) is representative of an instantaneous throttle opening (Thd).

8. A control system according to claim 1, wherein:
   said auxiliary equipment (51) comprises a compressor (51) of a cooling-oriented air conditioner.

* * * * *